Oct. 9, 1956
D. H. WHITE
2,766,107
PRODUCTION OF GRANULAR MIXED FERTILIZERS
FROM UREA, ACID ANHYDRIDES AND AMMONIA
Filed Sept. 22, 1952
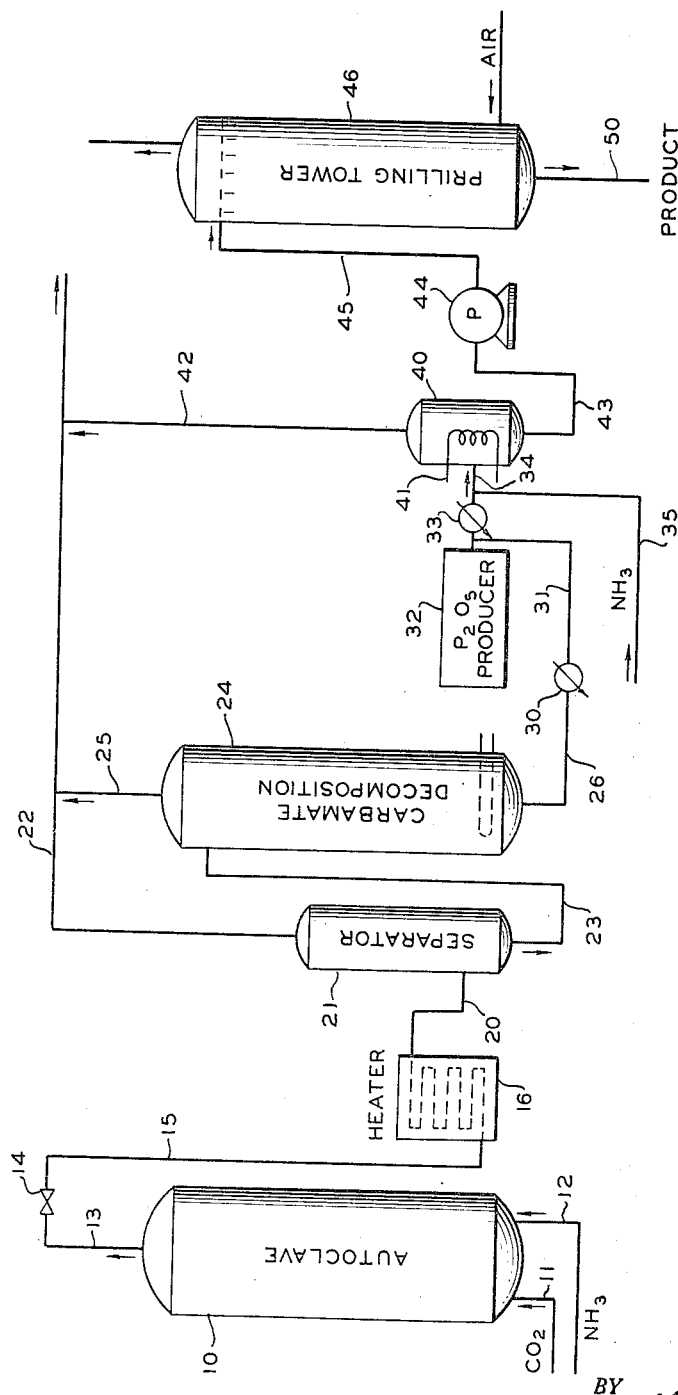
INVENTOR.
D. H. WHITE
BY
Hudson & Young
ATTORNEYS 2,766,107
Patented Oct. 9, 1956

2,766,107

PRODUCTION OF GRANULAR MIXED FERTILIZERS FROM UREA, ACID ANHYDRIDES AND AMMONIA

Donald H. White, Bartlesville, Okla., assignor to Phillips Petroleum Company, a corporation of Delaware Application September 22, 1952, Serial No. 310,758

9 Claims. (Cl. 71—29)

This invention relates to a process for the production of a granular mixed fertilizer containing urea and to the products produced thereby. In one of its aspects this invention relates to an improved process for the production of a dry granular enriched mixed fertilizer containing urea and having a ratio of N:P$_2$O$_5$:K$_2$O of about 1:1:0. In another of its aspects this invention relates to an improved process for the production of a dry granular mixed fertilizer containing urea and ammonium sulfate.

Due to the availability of raw materials for its manufacture and its relatively high percentage of available nitrogen, urea is fast becoming popular as a fertilizer. Also, urea nitrogen is available to soil at a slower rate than other inorganic forms and is more suitable for use in sandy soils from which quick acting forms of nitrogen, such as nitrate nitrogen, are leached during periods of heavy rainfall.

Many users prefer to employ a fertilizer which contains more than one soil nutrient. Thus commercial fertilizers which contain a ratio of N:P$_2$O$_5$:K$_2$O of 1:2:1 have enjoyed considerable popularity. There has been a trend, however, toward the use of a fertilizer having a 1:1:0 ratio as evidenced by the rising popularity of Ammophos B which contains 16 percent N and 20 percent P$_2$O$_5$. Of course, the use of a particular fertilizer will depend upon the requirements of the soil being treated.

In the production of solid fertilizers the physical properties of the resulting product are in general of greater significance than the chemical, the latter in many instances being regulated by law. A good solid fertilizer, besides having the necessary chemical properties, is characterized by being uniform in size, preferably granular, and easily distributable upon the land, as in the conventional farmer's drill; it is also hard and comparatively dense and does not cake when stored for long periods of time.

The present invention is directed to a process for producing a mixed fertilizer containing urea whereby the conventional steps of evaporation of solutions and drying of solids is eliminated and a product obtained which is dry, granular, uniform in size and easily distributable upon the land. Thus, by operating in accordance with the present invention one enjoys not only an economy by the reduction of process steps but also produces a mixed fertilizer containing desirable chemical and physical properties.

The accompanying drawing is a schematic view of one embodiment of my invention.

Urea is produced from ammonia and carbon dioxide in accordance with the following chemical reaction:

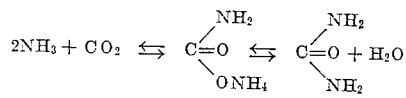

The reactions involved are exothermic in nature with considerable heat being generated in the production of ammonium carbamate and urea. The main factors affecting the first equilibrium are the temperature, pressure and percentage excess ammonia. Generally, a 15 to 200 percent excess of ammonia is employed. The ammonia and carbon dioxide are compressed to operating pressure and cooled to about 100° F. The reactants, in the liquid state, are then passed to a lead or silver-lined autoclave in which the temperature of the reaction is maintained in the range of 350 to 400° F. and the pressure in the range of 2,000 to 5,000 p. s. i. g. The retention time in the autoclave is about 1 to 2 hours. The autoclave employed can be either a continuous or batch type. The conversion of reactants is of the order of 40 to 60 percent with the product produced in the autoclave being a melt of ammonium carbamate, urea and water. The autoclave melt is passed through a pressure reducing valve into a flash heater where the pressure is maintained at about 10 p. s. i. g. The melt is cooled by flashing of excess ammonia and some water and the decomposition of a portion of the unconverted ammonium carbamate. The melt is retained in the flash heater for a short period of time and is heated in order to decompose unconverted ammonium carbamate. The melt is then subjected to a separation treatment where unreacted ammonia and CO$_2$ and other vapors are separated from the melt, the liquid melt then being subjected to another treatment, usually in a still, for the further decomposition of unconverted ammonium carbamate. The melt recovered from this last treatment is comprised substantially of urea and a minor amount of water, usually about 20 percent by weight of the melt.

According to my invention I treat the melt of urea with a water removal agent such as P$_2$O$_5$ or SO$_3$ or some compound which is capable of taking up the water to form an acid and which when neutralized with ammonia will contain chemicals useful as plant foods. This water removal agent may be added either as a solid, liquid or vapor, the latter being the preferred form. Either during or after the addition of the water removal agent the mixture can be cooled to remove the heat of reaction. The amount of water removal agent added will vary depending on the amount of water in the melt being treated. It is the preferred practice to add a stoichiometric amount of water removal agent to react with all the water present in the melt. However, in some instances one can add a smaller amount so that the granular prill recovered from the bottom of the prilling tower has about 2 to 3 percent moisture. In such instances it may be necessary to dry the product. The melt thus-produced is then treated with anhydrous ammonia to neutralize said mixture and form another melt containing urea and the corresponding ammonium salt. This last melt is rapidly cooled to a temperature in the range at which the resulting melt will solidify in a few seconds after dispersion. This temperature is preferably in the range 20 to 40° F. above the temperature at which the entire melt becomes solid. Occasionally it is desirable to operate at a higher temperature level. The solidification temperature of the melt will depend upon the amount and nature of the ammonium salt present therein which will in turn depend upon the amount of water in the original melt and the nature of the water removal agent employed. The determination of the solidification temperature is a simple thing well within the skill of the art. The thus-cooled melt is then dispersed through a fluid distributor into a tower and contacted, preferably countercurrently, with cool moving gas, preferably air. The dispersion means may be rotating discs or other suitable spraying devices. The products recovered at the bottom of the tower are in the form of smooth, hard globular granules which are uniform in size and have excellent drilling properties. The product can then be further dried if necessary for the above-mentioned reasons and/or coated with an argillaceous material if desired to prevent undue absorption of moisture.

I have found that the secret to obtaining a prillable product is fast mixing of reactants followed by short surge times prior to prilling. The preferred elapse of time during the water removal, neutralization and cooling steps to the time of ultimate dispersion of the melt into the prilling tower is within the range of 2 to 10 minutes, preferably 3 to 6 minutes. This is advantageous in that decomposition of urea is minimized and in those instances where the resulting ammonium salt is not entirely soluble in the urea melt the rapid cooling results in crystal sizes approaching colloidal sizes which are randomly distributed throughout the resulting granular product.

Referring now to the drawing in detail, liquefied ammonia and carbon dioxide under operating pressure and at a temperature of about 600° F. enter autoclave 10 through lines 11 and 12 where they are maintained for a period of about 1 to 2 hours at a temperature in the range of 350 to 400° F. and a pressure of 2,500 to 5,000 p. s. i. g. In autoclave 10 the ammonia and carbon dioxide undergo a conversion of about 40 to 60 percent to produce a melt containing urea, ammonium carbamate and water. This melt leaves autoclave 10 through line 13 passing through expansion valve 14 and line 15 into flash heater 16 where it is maintained for a period of about 15 minutes at a temperature in the range of 200 to 250° F. and at a pressure of from 5 to 20 p. s. i. g. This results in a partial decomposition of unconverted ammonium carbamate. The melt then leaves heater 16 through line 20 where it is passed to separator 21. In separator 21 the melt is separated from gaseous products such as ammonia, carbon dioxide and water vapor which are vented therefrom through line 22. The melt leaving separator 21 through line 23 passes to carbamate decomposition zone 24 which can comprise a tray type column, in which practically all of the remaining ammonium carbamate in said melt is decomposed into carbon dioxide and ammonia. Gaseous products therefrom are vented through line 25. The conditions prevailing in said zone 24 are a temperature of about 260° F. and a pressure of about 10 to 20 p. s. i. g. A liquid melt comprising substantially urea and a minor amount of water, usually about 20 weight percent, is recovered from said zone 24 through line 26. If necessary, control cooler 30 may be employed to maintain the temperature of said melt in the vicinity of 250° F. The thus-cooled melt passing through line 31 is admixed with a stoichiometric amount of vaporous phosphorus pentoxide produced in zone 32 to react with the water and the resulting melt of urea and phosphoric acid is rapidly cooled in cooler 33 to remove the heat of reaction between the water and phosphorus pentoxide and to maintain the temperature of said melt at about 270° F. This second melt is then contacted with a stoichiometric amount of anhydrous ammonia entering line 34 through line 35 to produce a melt containing urea and monoammonium phosphate. This melt is passed into surge chamber 40 where it is cooled to a temperature in the range of 20 to 40° F. above the solidification temperature of the melt by means of cooling coil 41. In surge chamber 40, besides cooling, vaporous products are separated and vented therefrom through line 42. The melt is retained in said surge chamber 40 for as short a period as possible, a few seconds up to several minutes, preferably from 1 to 2 minutes. The thus-conditioned melt leaves surge chamber 40 through line 43 where it is pumped by means of pump 44 through line 45 into the top of prilling tower 46. In prilling tower 46 it is dispersed through suitable dispersing means into a stream of cool upwardly moving air where the thus-dispersed particles are solidified. Careful regulation of the temperature of the melt dispersed in said prilling tower is necessary so as to avoid producing a product which has not entirely solidified, viz. temperature too high, or in which the product is not granular by virtue of too cool a temperature. The product obtained at the bottom of prilling tower 46 through line 50 is a dry globular granular mixed fertilizer which has excellent drilling properties and which can be bagged and shipped without further treatment. The product may be coated, however, with an argillaceous material to reduce its hygroscopicity.

The elapse of time between the removal of melt from zone 24 and its ultimate dispersion into prilling tower 46 should be within the range of 2 to 10 minutes, preferably from 3 to 6 minutes.

*Example*

A melt is obtained from zone 24 comprising 100 tons per stream day of urea, 0.3 T./S. D. of ammonium carbamate, 25.8 T./S. D. of water and 0.3 T./S. D. of dissolved ammonia. This melt at a temperature of about 260° F. is contacted with 68 T./S. D. of vaporous $P_2O_5$ at a temperature of about 500° F. The resulting melt of urea and phosphoric acid is rapidly cooled and then contacted with 16.4 T./S. D. of anhydrous ammonia to produce a melt containing urea and monoammonium phosphate. The resulting melt is rapidly cooled to a temperature in the range of 260 to 280° F. and gaseous products separated therefrom in a surge chamber. Surge time is in the vicinity of 1 to 2 minutes. The thus-cooled melt is pumped to a prilling tower where it is contacted with countercurrently moving cool air. 215 T./S. D. of a dry globular granular mixed fertilizer containing 100 T./S. D. of urea, 110 T./S. D. of monoammonium phosphate and 5 T./S. D. of impurities is obtained. This product has a ratio of $N:P_2O_5:K_2O$ of 27:31:0. The product is easily distributable upon the land having good physical characteristics and contains a higher percentage of available nitrogen and $P_2O_5$ than in other commercially available fertilizers.

While this invention has been described and exemplified in terms of its preferred embodiments those skilled in the art will readily appreciate that modifications can be made without departing from the spirit and scope of the invention as herein described.

I claim:

1. A process for the production of a granular fertilizer which comprises contacting a melt containing urea and a minor amount of water with a substantially stoichiometric amount of a water removal agent selected from the group consisting of sulfur trioxide and phosphorous pentoxide, to produce a melt containing urea and the corresponding acid, rapidly cooling the thus-produced melt, contacting it with anhydrous ammonia to produce a melt containing urea and the corresponding ammonium salt, rapidly cooling the thus-produced melt to a temperature at which it will solidify in a few seconds after dispersion, dispersing said melt through a fluid distributor into a tower, and contacting the dispersed particles with a cool gas to produce a solid granular product useful for plant food, the period of time elapsed between the contacting of the melt with water removal agent and the ultimate dispersion of melt being in the range of two to ten minutes.

2. A process according to claim 1 wherein sulfur trioxide is employed as the water removal agent.

3. A process for the production of a dry granular fertilizer comprising reacting carbon dioxide and ammonia to form a melt consisting essentially of urea, ammonium carbamate, and water, separating the gases therefrom, heating the melt sufficiently to effect thermal decomposition of the ammonium carbamate, whereby a melt is recovered which consists essentially of urea and a minor amount of water, treating said melt with a substantially stoichiometric amount of a mineral acid anhydride to form the corresponding acid in situ, rapidly cooling the acidified melt to remove the heat of solution therefrom, contacting said melt with anhydrous ammonia to convert the acid content thereof to the corresponding ammonium salt, rapidly cooling the ammoniated melt to a temperature of about 20 to 40° above its solidification temperature, and then solidifying said melt by dispersing it in a cool gas stream so as to form a dry granular fertilizer, the time interval between the treatment with acid anhydride and the dispersing step being in the range of 2 to 10 minutes.

4. Process of claim 3 wherein the acid anhydride is $P_2O_5$.

5. Process of claim 3 wherein the acid anhydride is $SO_3$.

6. A process for the production of a dry granular fertilizer which comprises reacting carbon dioxide and ammonia to produce a melt containing urea, ammonium carbamate, and water, flash heating said melt to partially decompose the ammonium carbamate, separating the gaseous products from said flashing step, thermally decomposing the residual ammonium carbamate, the resulting melt consisting essentially of a major amount of urea and a minor amount of water, treating said melt with a substantially stoichiometric amount of an acid anhydride selected from the group consisting of $P_2O_5$ and $SO_3$, whereby the corresponding acid is formed in situ within the melt, rapidly cooling the acidified melt to remove the heat of solution therefrom, contacting the cooled melt with anhydrous ammonia to convert the acid content to the corresponding ammonium salt in situ therein, rapidly cooling the ammoniated melt to a temperature of incipient solidification, and dispersing it in a cool gas flowing countercurrently thereto to produce a solid dry granular product, the time elapsed between the dehydration step and the dispersion step being from 2 to 10 minutes.

7. A process for producing a dry granular mixed fertilizer which comprises reacting carbon dioxide and ammonia at a temperature in the range of 360–400° F. and at a pressure in the range of 2500–5000 p. s. i. g., to produce a melt of ammonium carbamate, urea, and water; flash heating said melt at a temperature of 200–250° F. and a pressure of 5–20 p. s. i. g., whereby the ammonium carbamate is partially decomposed; separating the gaseous products therefrom; thermally decomposing the remaining ammonium carbamate and separating the resulting gases from the melt, the latter being recovered as a concentrate of urea and about 20% by weight of water; contacting said melt with a substantially stoichiometric amount of vaporous $P_2O_5$ to form $H_3PO_4$ in situ therein; rapidly cooling the acidified melt to remove the heat of solution therefrom; contacting it with at least a stoichiometric amount of anhydrous ammonia to form ammonium phosphate therein; rapidly cooling the ammoniated melt to a temperature in the range of 20–40° F. above its solidification temperature; and dispersing it into a cooling gas to form a dry granular fertilizer product, the period of time elapsed between the addition of $P_2O_5$ and the ultimate dispersion step being in the range of 2 to 10 minutes.

8. The process of claim 7 wherein the elapsed time between the addition of $P_2O_5$ and the dispersion step is within the range of 3–6 minutes.

9. In a process for the production of a dry granular fertilizer wherein a melt comprising urea and a minor amount of water is formed, the improvement comprising the step of treating said melt with a substantially stoichiometric amount of a mineral acid anhydride to form the corresponding acid in situ therein, thereby eliminating the need for evaporative drying of the urea.

References Cited in the file of this patent

UNITED STATES PATENTS

| | | |
|---|---|---|
| 1,280,650 | Bosch | Oct. 8, 1918 |
| 1,440,056 | Clarkson et al. | Dec. 26, 1922 |
| 1,884,751 | Krase | Oct. 25, 1932 |
| 1,894,136 | Tyler et al. | Jan. 10, 1933 |
| 2,017,588 | De Ropp et al. | Oct. 15, 1935 |
| 2,022,673 | Kniskern | Dec. 3, 1935 |
| 2,307,253 | Yee et al. | Jan. 5, 1943 |
| 2,369,110 | Harford | Feb. 6, 1945 |
| 2,632,771 | White | Mar. 24, 1953 |

FOREIGN PATENTS

| | | |
|---|---|---|
| 357,461 | Great Britain | Sept. 24, 1931 |